April 28, 1925.
E. J. SCHRAMKE
VEHICLE
Filed Sept. 29, 1924     2 Sheets-Sheet 1
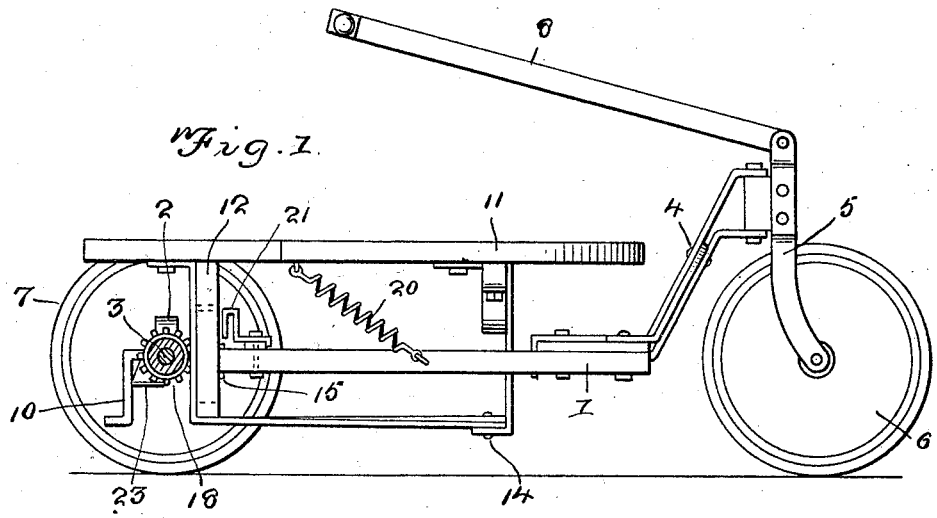
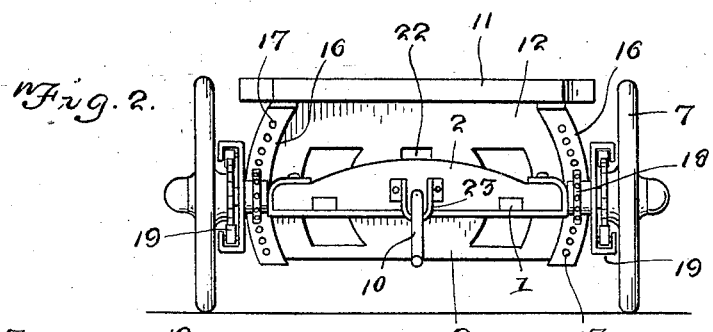
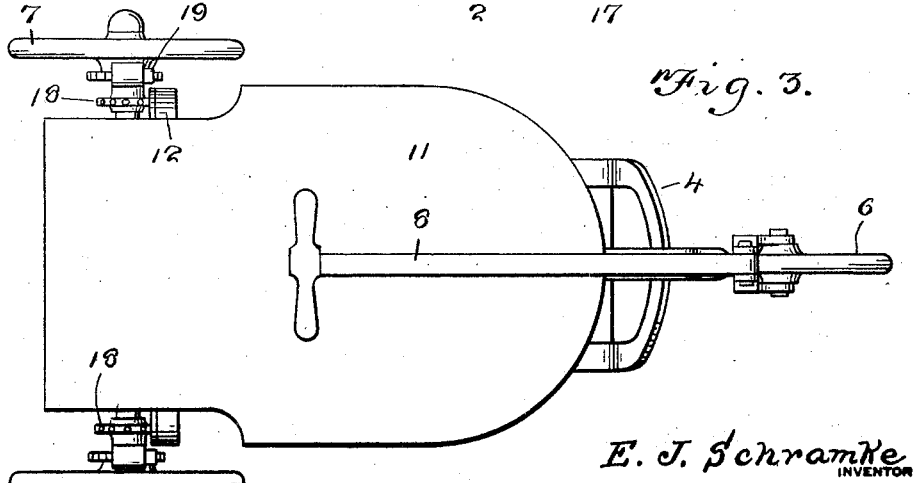

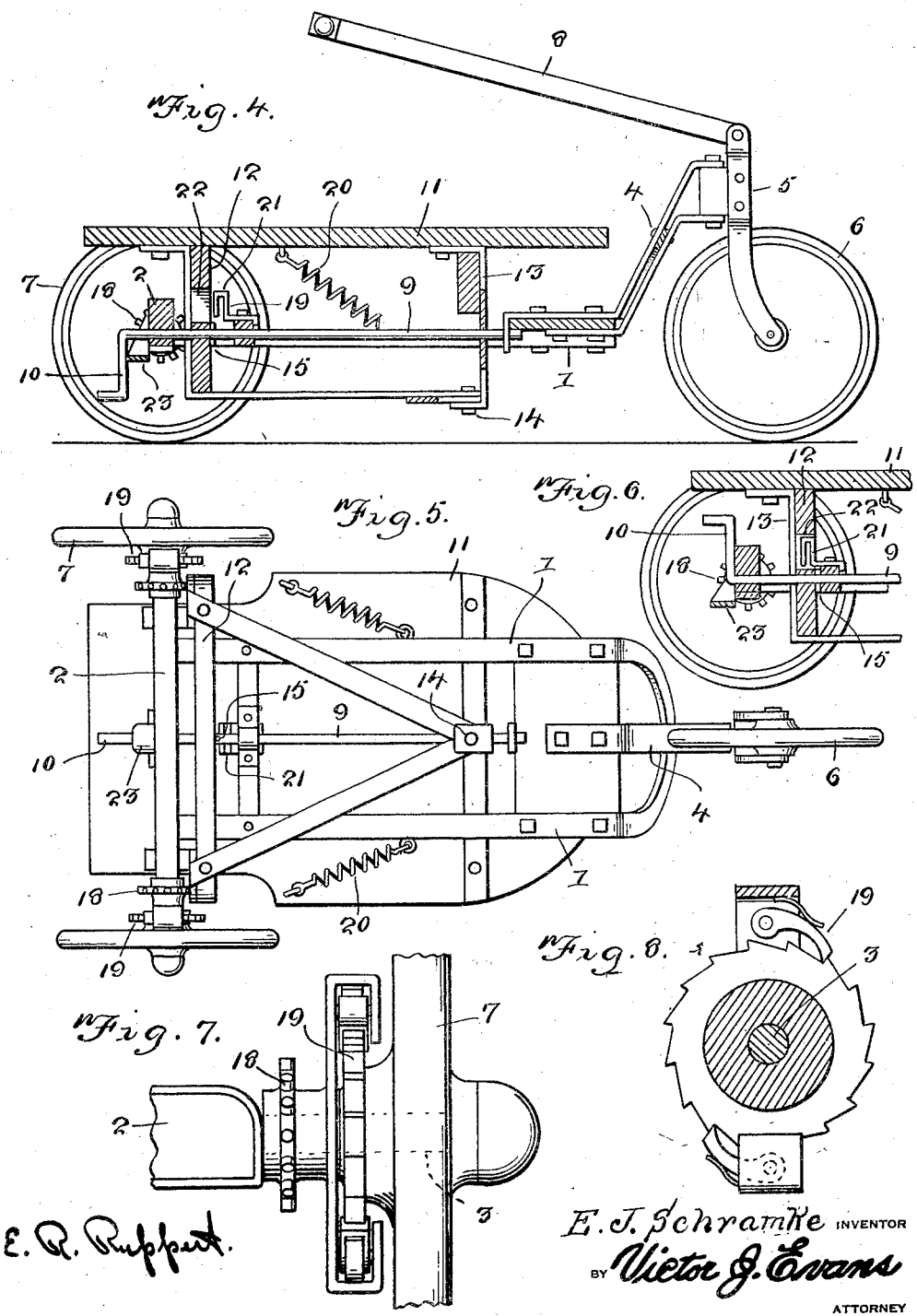

Patented Apr. 28, 1925.

1,535,950

UNITED STATES PATENT OFFICE.

EDWARD J. SCHRAMKE, OF SAGINAW, MICHIGAN.

VEHICLE.

Application filed September 29, 1924. Serial No. 740,647.

*To all whom it may concern:*

Be it known that I, EDWARD J. SCHRAMKE, a citizen of the United States, residing at Saginaw, W. S., in the county of Saginaw and State of Michigan, have invented new and useful Improvements in Vehicles, of which the following is a specification.

This invention relates to a toy vehicle, the general object of the invention being to provide means for propelling the vehicle by a rocking movement of the platform thereof, with means for rendering such means inactive when desired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the invention.

Figure 2 is a view of the rear end thereof.

Figure 3 is a plan view.

Figure 4 is a longitudinal sectional view.

Figure 5 is a bottom plan view.

Figure 6 is a sectional detail view showing the parts in inoperative position.

Figure 7 is an enlarged detail view showing the sprocket and ratchet mechanism of one of the rear wheels.

Figure 8 is a sectional detail view through the ratchet mechanism.

In these views, 1 indicates a frame which includes the rear cross piece 2, which carries the rear axle 3 and the upwardly extending front part 4 to which the front fork 5 is swiveled. This fork carries the front wheel 6 and the rear wheels 7 are carried by the ends of the rear shaft or axle. A handle 8 is pivotally connected with the upper end of the fork 5 so that the fork can be shifted to steer the vehicle. A shaft 9 is rotatably mounted at the center of the frame and the rear end of said shaft is provided with a crank handle 10. The shaft also has longitudinal movement in the frame. A platform 11 is provided with the depending pieces 12 and metal straps 13 are fastened to the lower face of the platform and extend downwardly along the depending pieces and the rear straps have forwardly extending portions which are fastened to the front strap, as shown at 14. The frame formed by the depending pieces 12 and the straps 13 is pivoted on the shaft 9 and is held against sliding movement on the shaft by the pin 15 carried by the shaft engaging the rear depending part 12. The portions of the rear straps engaging the rear depending piece 12 are of arc formation, as shown at 16, and these parts are provided with perforations 17 which are engaged by the pins of the pin wheels 18, one of which is connected with each of the rear wheels 7 by the ratchet means shown generally at 19. Thus as the platform 11 is rocked on the shaft 9 the pin wheels will be revolved by the perforated parts 16 of the straps, such wheels being moved in one direction on the downward movement of each strap and in another direction on the upward movement thereof but only one of these motions is transmitted to the wheel by the ratchet mechanism 19. Thus the vehicle is propelled by the rocking movement of the platform so that a child standing on the platform and rocking it back and forth can propel himself along a surface without touching the surface with his foot. Springs 20 connect the platform with the frame 1 and tend to hold the parts, including the shaft 9, in a forward position where a latch member 21 will engage an opening 22 made in the rear depending part 12 and thus prevent rocking movement of the platform. In this position of the parts the perforated parts of the straps 16 are out of contact with the pin wheels. Thus the vehicle can be used as an ordinary vehicle with the parts in this position. When the vehicle is to be propelled by a rocking movement of the platform the crank handle 10 is turned downwardly which will place it into engagement with a cam member 23 on the part 2 of the frame 1, which will cause the shaft 9 to move rearwardly and the platform 11 and its frame will be caused to move with this shaft through the pin 15, this movement of the parts stretching the springs 20, freeing the latch member 21 and placing the perforated parts 16 in engagement with the pin wheels. Then the device can be propelled by a rocking movement of the platform.

From the foregoing it will be seen that I have provided means whereby a toy vehicle can be propelled along a surface by a rocking movement of a platform imparted to it by a child standing on the same and rocking back and forth, the child supporting himself on the platform by the handle 8, which also permits him to steer the vehicle. Then when the child wishes to use the vehicle as an ordinary wagon he simply turns the shaft 9 by its handle 10 to remove the handle out of contact with the cam 23 so that the springs 20 will throw the parts forwardly, disengaging the pin wheels from the perforated parts 16 and cause the latch member 21 to engage the opening 22 which will hold the platform in an upright position and against rocking movement.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A vehicle of the class described comprising a wheeled frame, a platform tiltably supported on the frame, racks connected with the platform and rack wheels connected with some of the wheels of the vehicle whereby the rocking movement of the platform will rotate the wheels and means for moving the platform to a position where the racks will be out of engagement with the rack wheels and means for preventing the platform being rocked when in this position.

2. A vehicle of the class described comprising a frame, a rear axle carried thereby, a steering wheel at the front of the frame, a platform tiltable about its longitudinal axis in the frame, pin wheels on the axle, racks carried by the platform and engaging the same so that the tilting movement of the platform will rotate the wheels, ground wheels at the ends of the axle, ratchet mechanism connecting the pin wheels with the ground wheels, a latch member, spring means for moving the platform to a position where it will engage the latch member which holds it against tilting movement and to a position where the racks are out of engagement with the pin wheels and manually operated means for moving the platform against the spring means to release it from the latch member and place the racks in engagement with the pin wheels.

3. A vehicle of the class described comprising a frame, a rear axle carried thereby, a steering wheel at the front of the frame, a platform tiltable about its longitudinal axis in the frame, pin wheels on the axle, racks carried by the platform and engaging the same so that the tilting movement of the platform will rotate the wheels, ground wheels at the ends of the axle, ratchet mechanism connecting the pin wheels with the ground wheels, a latch member, spring means for moving the platform to a position where it will engage the latch member which holds it against tilting movement and to a position where the racks are out of engagement with the pin wheels, manually operated means for moving the platform against the spring means to release it from the latch member and place the racks in engagement with the pin wheels, such means consisting of a crank shaft which forms the pivot for the platform and a cam part with which the crank engages for moving the shaft and the platform rearwardly.

In testimony whereof I affix my signature.

EDWARD J. SCHRAMKE.